Nov. 19, 1968 M. R. KARECKI 3,411,729

TAPE RECORDER

Filed Oct. 13, 1966 3 Sheets-Sheet 1

INVENTOR.
MARION R. KARECKI

BY Brown, Jackson, Boettcher & Dienner

ATTY.

Nov. 19, 1968 M. R. KARECKI 3,411,729

TAPE RECORDER

Filed Oct. 13, 1966 3 Sheets-Sheet 2

INVENTOR.
MARION R. KARECKI

BY Brown, Jackson, Boettcher & Dienner

Attys.

INVENTOR.
MARION R. KARECKI
BY Brown, Jackson, Boettcher & Dienner
Att'ys.

United States Patent Office
3,411,729
Patented Nov. 19, 1968

3,411,729
TAPE RECORDER
Marion R. Karecki, Bloomington, Minn., assignor to V-M Corporation, Benton Harbor, Mich., a corporation of Michigan
Filed Oct. 13, 1966, Ser. No. 586,493
7 Claims. (Cl. 242—55.12)

ABSTRACT OF THE DISCLOSURE

Pause mechanism, in a tape recorder, permits tape travel to be instantaneously halted and restarted independently of the stop button. A motor-operated cam is in continuous engagement with a slide member acting on tape braking mechanism in the tape recorder and is intermittently operated by a motor which may be energized bf depressing a control button connected thereto by a cable of suitable length. The motor is energized through two sets of switches, one being operated by the control button and the other being operated by an actuating lever with which the cam also is in continuous engagement, in an arrangement whereby successive operations of the control button operates the motor first to halt and then to restart the motor.

This invention relates to a tape recording and reproducing machine, and more particularly to novel control means provided therefor which permit an operator, when located a distance from the machine, to temporarily halt and thereafter restart the tape travel. Although the invention will be explained in connection with a magnetic tape recorder, it will be understood that the invention applies equally well to other recording-reproducing machines, including those employing wires or belts.

Known recording and reproducing machines are generally provided with one or more heads for reproducing and/or recording information on the tape, wire, belts or the like. In such machines the tape is driven past the head from a supply reel to a take-up reel by means of a continuously turning capstan. Simultaneously with the energizing of the head to effect recording and/or reproducing from the tape the rotational movement of the capstan is transmitted into longitudinal movement of the tape by means of a pressure roller which the operator is able to move into cooperative engagement with the capstan to frictionally engage the tape therebetween. Movement of the tape is halted by carrying the pressure roller away from the capstan and simultaneously actuating brake bands or their equivalent into releasable frictional engagement with the outer periphery of drums provided on the spindles of the supply and take-up reels.

Conventionally such machines are provided with control buttons and associated mechanism for effecting record-play, as well as fast forward and rewind of the tape. They are also provided with a stop button which actuates the mechanism to move the pressure roller away from the capstan and simultaneously set the reel brake mechanism. Because of the possibility of tape damage and other problems which would result if one were to accidentally press for example the rewind button while the machine was set for play or record, many recording machines are so adapted that once any one of the fast forward, rewind or record-play control buttons has been depressed to initiate the corresponding action of the tape, no other button can be actuated until and unless the stop button has been first pressed. This means that one cannot unintentionally change the speed of the tape or reverse its direction of travel without first stopping the tape travel. However, it also means that each time the stop button is used, it clears the previous setting of the machine, and the machine must be therefore reset.

However, when using such machines to record music or other information it is often desirable to halt the tape travel temporarily at irregular intervals during a recording session. For example, it is desirable to be able to avoid the necessity of having to record unwanted portions of programs or to record during lulls of conversation or at intermission time. It is also useful to be able to instantly stop and as quickly restart the tape during play-back of the recording, as when editing the tape. For this reason, many tape recorders are also provided with a further control button which may be conveniently operated to stop the tape travel, that is to effectively set the brakes and move the pressure roller away from the capstan and the tape passing therebetween, but bypassing the stop button so as not to upset the settings of the other control buttons. This button is commonly referred to as the "pause" button and conventionally operates a lever or slide member which independently acts on the reel brakes and also moves the pressure roller out of its frictional engagement with the capstan and the associated tape therebetween.

There are times, however, when it is also convenient or necessary to be able to halt the tape travel while the operator is a distance from the recording machine, wherefor a principal object of the invention is not only to provide means and/or mechanism for instantaneously stopping and restarting tape travel, but to provide such mechanism which is also operable at a distance from the recording machine.

In accordance with the invention, such mechanism comprises a motor operated cam which acts on the mentioned brake setting lever slide member and is controlled by energizing and deenergizing the motor. The motor which operates the cam will be located within the housing of the recording-reproducing machine; however, the switch which energizes and deenergizes the motor may be connected thereto by lines within a sheathed cable of any suitable length so that remote control of the "pause" function is conveniently obtained.

It is a feature of the invention, however, that means are provided such that the motor need be operated only at the times of actually setting the brakes and/or releasing them. Consequently, except in these two instances which comprise only a small fraction of a second in time, no current passes through the motor and long pauses cause no problem of the motor being damaged by overheating. Accordingly, relatively small and inexpensive motors may be employed for effecting the pause function and there is no need for concern whether the pause mechanism has been accidentally or purposely left in its operating or released condition.

Mechanism by which this feature is obtained represents the principal object of the present invention.

Other objects of the present invention include provision of a tape recorder with a remote control which can be conveniently operated to effectively stop the tape advance and then restart the tape movements. An additional object is to provide remote control mechanism for a tape recorder which is inexpensive to manufacture and yet particularly reliable as well as durable in its operation and construction.

Other and further objects, features and advantages of the invention will be apparent from the following description of an illustrated embodiment thereof given for the purpose of disclosure and taken in conjunction with the accompanying drawings in which like character references designate like parts throughout the several views and where:

Figure 1:
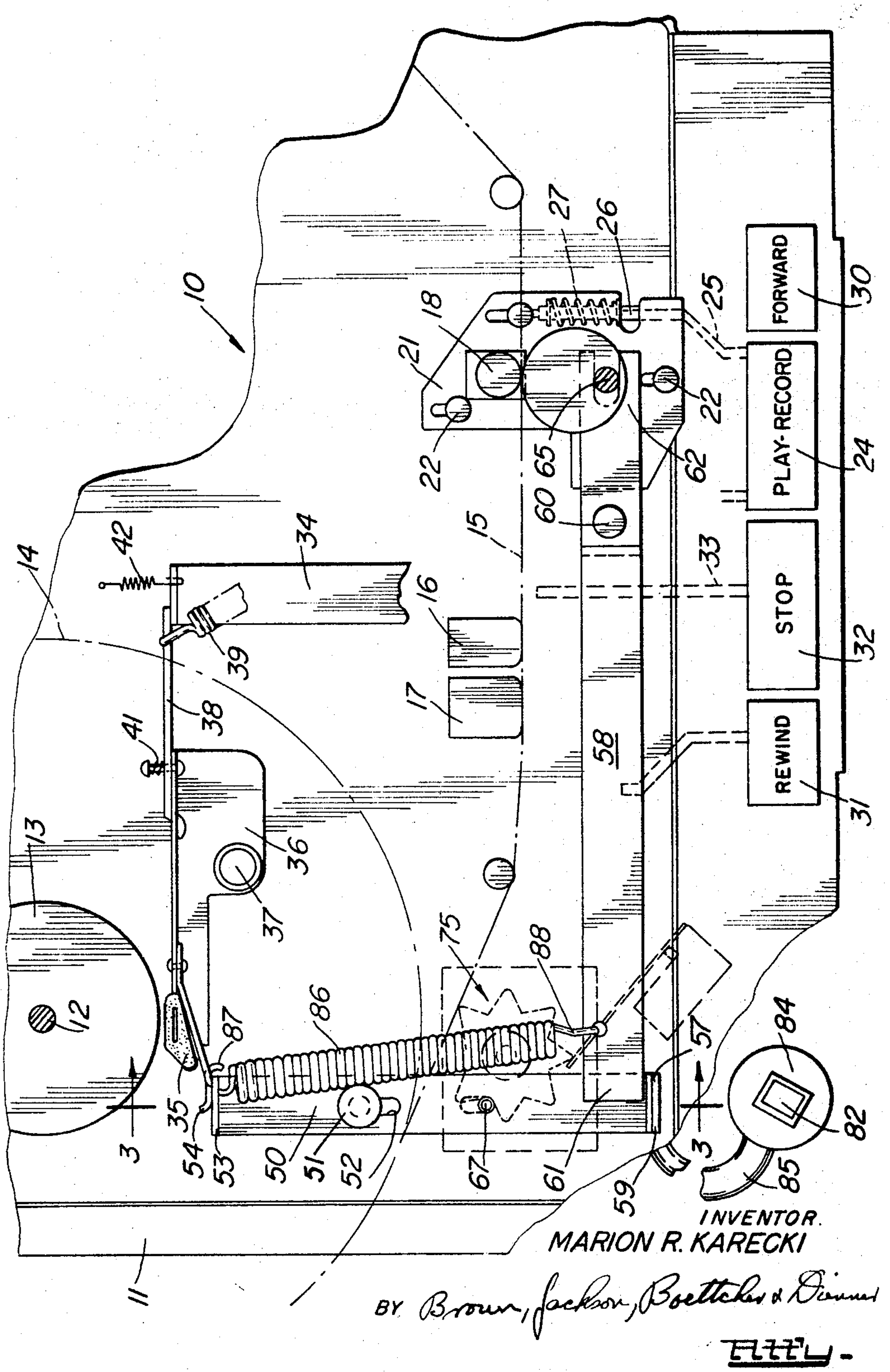
FIGURE 1 is a partially fragmented plan view of a tape reproducing-recording machine having a remote pause mechanism constructed in accordance with the present invention. Construction details and parts of the machine itself which are not essential to an understanding of the invention have been omitted for clarity of presentation and understanding thereof.

Referring now more specifically to the several views which illustrate the invention, and first to FIGURE 1, the invention is shown embodied in a tape recording and reproducing machine of conventional construction. This machine is indicated generally by the reference numeral 10. For the purposes of this description, such a machine will be understood to include a housing or base plate 11 on which is rotatably supported a spindle 12 having a brake drum 13 affixed thereto. The upper end of the spindle 12 is adapted for removably receiving a supply reel, shown in phantom lines at 14, which is loaded with tape 15 shown leading therefrom past a playing head 16 and a recording head 17 to take-up reel supported on a similarly constructed spindle but not shown. At 18 is a capstan rotatably mounted on the base plate and operatively connected to an electric motor so as to be driven thereby at a constant peripheral velocity. As mentioned, tape 15 leads to a take-up reel (not shown) which is removably mounted on a rotatable spindle corresponding to the first mentioned spindle 12. The take-up reel and supply reel supporting spindles are selectively clutched to the capstan 18 and/or its motor so as to turn therewith for winding the tape 15 thereon, depending on the direction of movement of the tape as is conventional. At 20 a pressure roller is shown supported on a movable guide 21 and is freely rotatable thereon about an axis disposed parallel to the axis of the capstan 18. Guide 21 is adapted for reciprocal movement in directions determined by cooperating slots and pins indicated generally at 22 which permit the pressure roller to be moved toward the capstan to effect frictional engagement of the tape therebetween and away from the capstan to relieve such engagement. With pressure roller 20 bearing against capstan 18, the rotational movement of the capstan is transmitted to the tape frictionally engaged therebetween so as to drive the tape off the supply reel 14, past the selectively energized one of the playing and recording heads 16 or 17 and onto the take-up reel.

At 24, is a manually depressible button marked "Play-Record" conveniently located adjacent the upper surface of the housing which is so adapted that when depressed it acts on arm 25 to cause lever 26, connected to the pressure roller guide 21, to move the guide 21 and thereby the pressure roller 20, against the action of a spring 27, into the aforedescribed relation with the capstan 18 to effect movement of the tape at the proper playing and/or recording speed. The details of construction by which button 24 effects said movement of the pressure roller and its guide 21, except insofar as thus described, is without pertinence to the invention being claimed and will be understood to be of conventional construction.

At 30, is a manually depressible "fast forward" button having conventional associated mechanism including a clutch by which rotation of the capstan is transferred to the take-up spindle at an increased speed ratio to effect rapid movement of the tape 15 in the same direction off the supply reel onto the take-up reel under conditions when it is not desired to record or play. At 31 is a manually depressible "rewind" button having associated mechanism by which the supply spindle may be clutched to the capstan so as to rotate the supply reel spindle in its reverse direction and effect movement of the tape back to the supply reel 14.

At 32 is a stop button which is depressed to release engagement of pressure roller 20 against capstan 18 with the tape therebetween and to set the reel brake mechanism so as to stop further tape advance. Locking means (not shown) are also provided which are actuated when any one of the play-record button 24, forward button 30, or rewind button 31 is depressed and which are released by and only by depressing the stop button. Such locking means constitute no part of the present invention as such, and since they are of conventional construction will not be further described.

Referring therefore to FIGURE 1, associated with the brake drum 13 of the supply reel spindle 12 is a brake band or the like 35, shown supported at one end of a rocker arm 36 which is pivotally mounted to base plate 11 so as to pivot on shaft 37. The opposed end of rocker 36 is connected to a spring 38; the free end of which lies in abutting, sliding contact with an upturned free end of operating lever 34. By conventional mechanism (not shown), stop button 32 is connected to lever 34 through operating arm 33, such that when button 32 is depressed, lever 34 is moved in a direction away from spring 38, whereupon spring 39 is permitted to effectively rotate rocker arm 36 about its pivotal connection on shaft 37 and thereby force brake band 35 into frictional engagement with the periphery of drum 13. It will be appreciated that each of the buttons 24, 30 and 31 have means associated therewith (not shown) which operate to release stop button 32 and allow spring 42 to return lever 34 to its normal position, FIGURE 1, where its upturned end reengages spring 38 and serves to hold brake band 35 out of engagement with drum 13, so that reel 14 is free for rotation in response to the movement of the tape which is simultaneously initiated by the depressing of the respective one of buttons 24, 30 or 31.

The aforedescribed construction is known and provides the setting in which the present invention is found. The present invention, however, provides remote control means which permit temporary movement of the brake band against the drum 13 when the machine is otherwise set for record or play. The control means also permits temporary relieving of the pressure roller 20 so that tape travel may be halted without disturbing the set of the play-record button 24, as would be the case if one were to stop the tape advance by operating the stop button 32. For this purpose a brake-actuating arm or slide 50 (FIG. 1) is slidably supported on the base plate 11 by means of a shouldered rivet 51 which extends through an elongated slot 52 formed in said plate 11. As illustrated by FIGURE 1, slot 52 is elongated in the direction of the longitudinal axis of the slide 50, such that the slide can be moved longitudinally in the direction toward the brake drum 13 a distance sufficient to permit its upturned end 53 thereof to slidingly engage the free end of spring member 54 connected to rocker arm 36 adjacent its end which carries the brake band 35. Movement of slide 50 and thereby its upturned end 53 against spring arm 54 has the desired effect of rocking arm 36 about its pivot 37 so as to urge the brake band 35 into frictional engagement with drum 13, the resiliency of spring connection 41 permitting spring member 38 to yield without moving lever 34. Thus, it can be seen that the brake actuating arm 50 serves to actuate the brake 35 independently of stop button 32. Operation of arm 50 also serves to disconnect frictional engagement between roller 20 and capstan 18 to halt the tape again, without disturbing the set position of stop button 32 and play-record button 24. For this purpose the brake actuating arm 50 is provided with an upturned end 59 at its other end which is operatively associated with end 61 of a lever 58. As illustrated in FIGURE 1, lever 58 is pivotally mounted to base 11 to swing about intermediately positioned shaft 60. Its opposite end portion 62 is bifurcated and engages about a guide pin 65 projecting from the pressure roller guide 21. Consequently when slide arm 50 is moved toward drum 13 to set brake band 35 against said drum, its other end 59 effectively rotates lever 58 about pivot shaft 60 to move pressure roller 20 away from the capstan by further compressing the spring 27 (the same having been initially compressed by depressing play-record button 34). If desired, upturned end 59 may be faced by a compressible pad 57 to soften the operating function thereof. By said act of pivoting lever 58, tape 15 is therefore released from its frictional engagement with capstan 18 and simultaneously its advance of the tape is braked by the application of brake band 35 on drum 13. Reverse movement of slide arm 50 has the opposite effect of relieving the brake band on the reel drum and also permitting spring 27 to again urge pressure roller 20 back against the capstan, as illustrated by FIGURE 1. It will be appreciated that these movements are brought about without actuating either the stop button 32 or play-record button 24.

A particularly important feature of the present invention is the novel means employed by which the aforedescribed longitudinal movement of slide arm 50 is effected. As shown best in FIGURE 3, said actuating means includes the motor 70 supported by bracket 72 to the underside of base 11 and having a star-wheel cam 75 secured to shaft 71 thereof so that it turns with said motor shaft and drivingly engages a depending portion of shoulder stud 67 fixedly mounted to the slide 50. As illustrated, stud 67 depends through a slot formed in the base plate 11 and which slot is elongated in the direction of the longitudinal axis of the slide arm 50 such that movement thereof is confined to longitudinal movement toward and away from spring member 53 a distance sufficient to permit the upturned end 53 of slide member 50 to engage the free end of the spring arm 54 to rock member 36 and thereby effectively urge brake band 35 into the desired frictional engagement with drum 13 as hereinbefore described.

Figures 3, 4, 5:
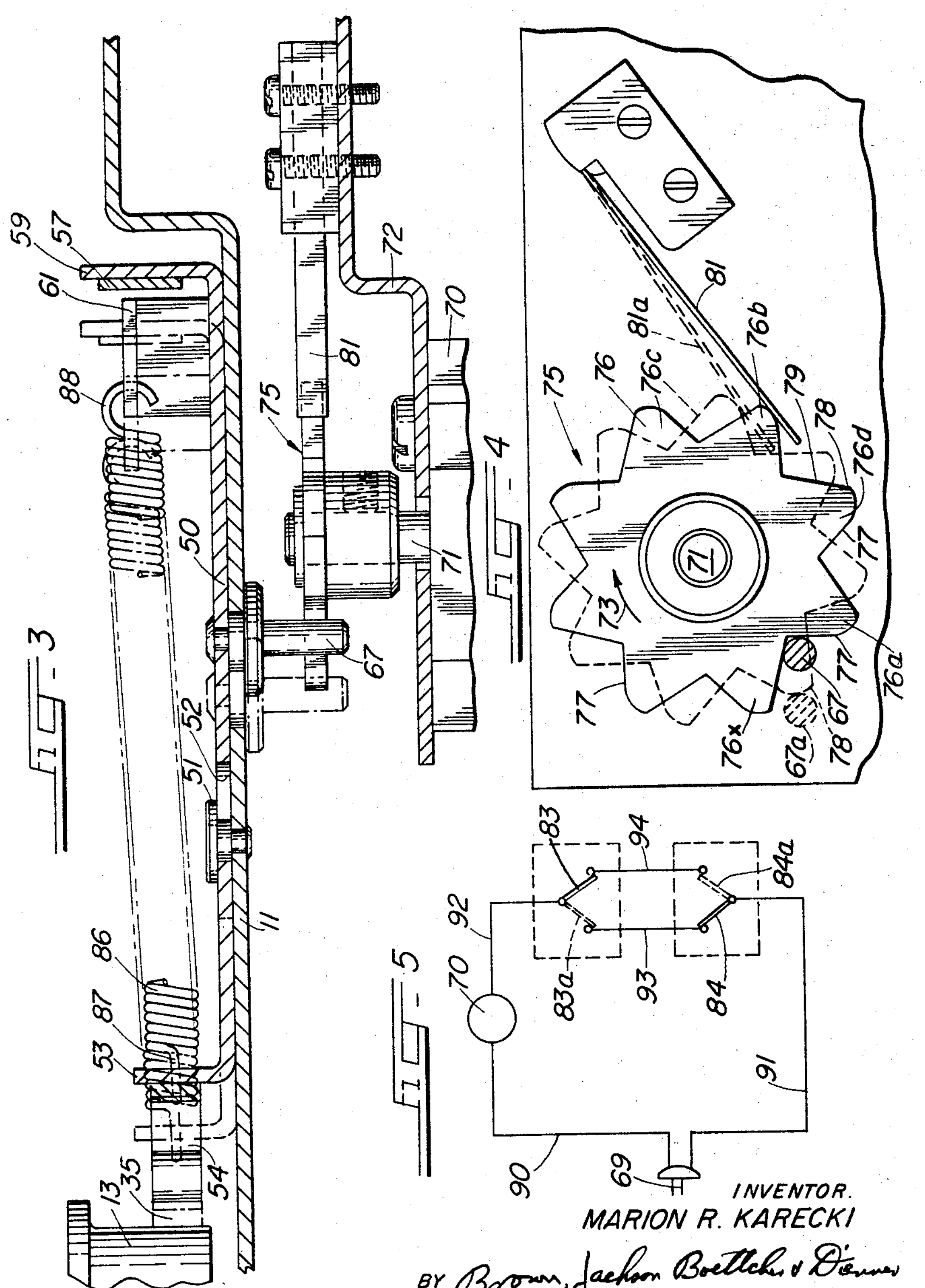
FIGURE 3 is a sectional view taken along lines 3—3 of FIGURE 1, looking in the direction indicated by the arrows, with the pausing position of the elements indicated in phantom lines.
FIGURE 4 is a partially fragmented horizontal view taken along lines 4—4 of FIGURE 3, looking in the direction indicated by the arrows and the pausing position of the elements indicated in phantom lines.
FIGURE 5 is a diagram of an exemplary circuit for remotely controlling the pausing mechanism.

As shown best in FIGURE 4, the undulated peripheral surface of star wheel cam 75 comprises a plurality of radially extending fingers or lobes 76 which are uniformly spaced about shaft 71. Each said fingers 76 comprises a radially offset leading or actuating surface 77, an arcuate end or transition dwell surface 78 and a trailing or return surface 79 for which purpose the star wheel cam is considered to be turning in a counterclockwise direction as indicated by arrows 73 in FIGURE 4. Both the actuating surface 77 and the trailing surface 79 of the lobes 76 comprise essentially straight lines but disposed at an acute angle to the radius of said cam. In the illustrated embodiment, cam 75 is shown having eight such fingers or lobes 76; however, any other number of lobes or fingers may be provided, depending on the relative response time required to effectively move actuating slide 50 into its brake setting and releasing movements.

Referring now to FIGURE 4, in the retracted position of the brake actuating slide 50, which is illustrated by FIGURE 1, stud 67 engages in the dwell area between two lobes 76 of the cam 75. This is illustrated by full line showing of the cam 75 in FIGURE 4, and is the normal position of brake actuating arm 50, stud 67 and star wheel cam 75.

Figure 2:
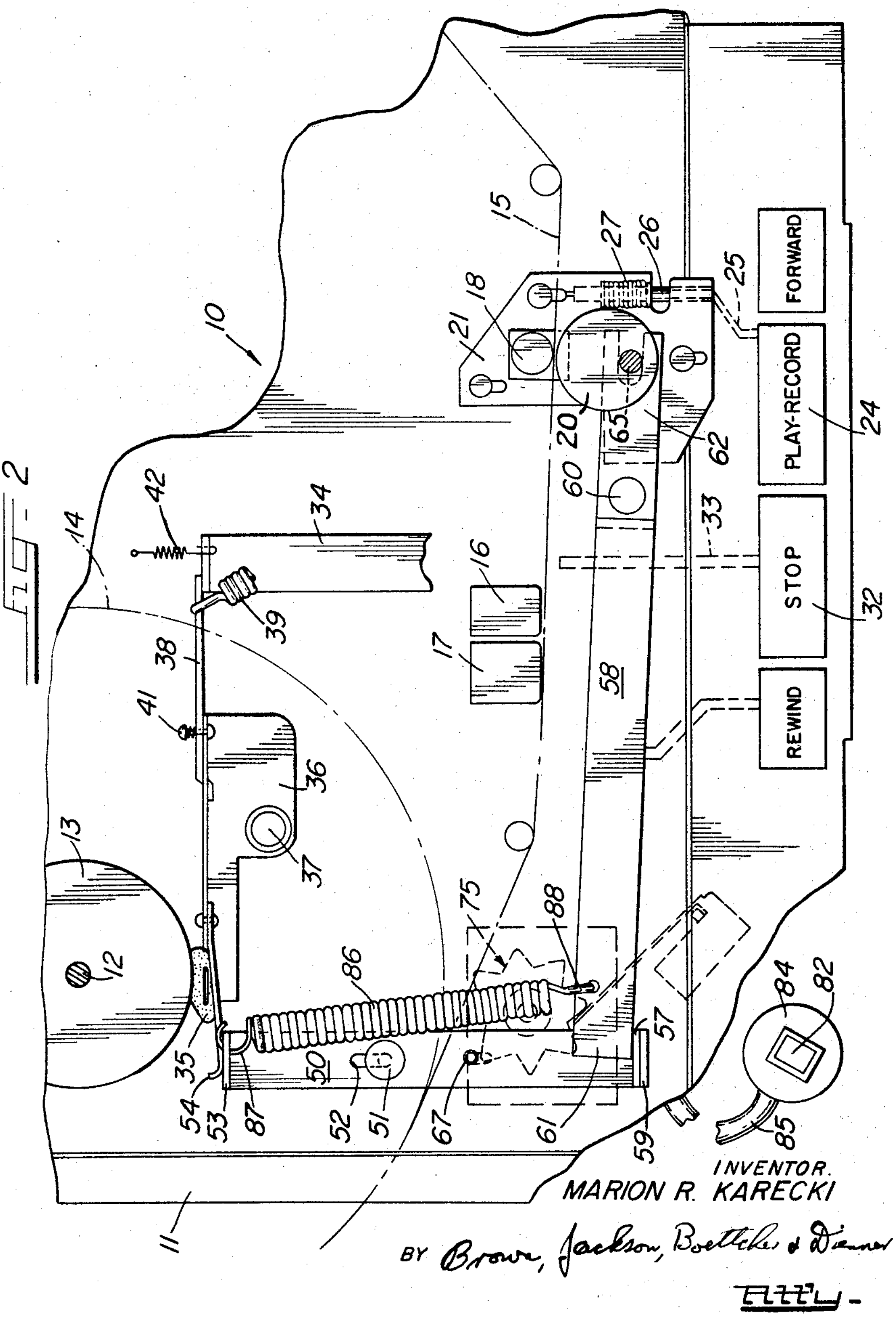
FIGURE 2 is a view generally similar to FIGURE 1, but indicating the pausing position of the various elements of the pause mechanism which comprises the invention.

Referring now to FIGURE 5, it will be seen that motor 70 is connected to a power connector 69 by line 90 and its other side by line 92, switch 83, alternately line 93 or 94, switch 84 and line 91. With switches 83 and 84 occupying the positions shown in full lines, motor 70 is not operating and cam 75 is stopped. As illustrated by FIGURE 4, stud 67 is resting at the bottom of the dwell between an adjacent pair of lobes 76 designated **76*x* and 76*a*. Wherefor slide 50 is in its retracted position and the recording machine operates in conventional manner. For example, with button 24 depressed, the tape 15 will move past the transducer heads as in the act of recording or reproducing (depending on which head has been energized). However, if for any reason it is desired to temporarily halt the tape travel but without actuating stop button 32, this may be readily obtained by depressing button 82 (FIGURE 1), which acts on switch 83 to shift it from its illustrated full line position to its phantom line position 83*a*. In this new position, 83*a*, the motor circuit is completed and the cam 75 will therefore start to turn. As the cam turns, the leading surface 77 of lobe 76*a* will act on stud 67 so as to move it to its phantom line position illustrated at 67*a* in FIGURE 4, where it engages on end 78 of said lobe 76*a*. In this new position of stud 67, the brake actuating slide member 50 will have been moved to its position as illustrated by FIGURE 2. In this new position of slide member 50, referred to as its "operating" position, its upturned end 53 has rocked arm 36 so that brake band 35 now engages brake drum 13. Simultaneously, the other upturned end 59 of said slide member 50 has pivoted lever 58 about fulcrum 60 and caused guide 21, and therefore pressure roller 20, to be moved out of engagement with the capstan 18 and against the action of spring 27. This pivoting of the lever 58 is facilitated by the relatively longer length of the lever arm against which the force of the motor acts, which compares with the shorter arm of the lever 58 against which the spring 27 acts. Therefore in this new position of slide member 50**, travel of the tape has been halted.

At the moment stud 67 moves to position **67*a*, means are provided where motor 70 is also automatically deenergized wherefore the tape travel will remain halted until button 82 is again depressed and switch 83 thereby moved back to its full line position illustrated in FIGURE 5. This obtains by reason that cam lobe 76*b* is simultaneously moved from its position indicated in FIGURE 5 in consequence to rotation of the cam so that switch operating arm 81 is free to move to the position indicated by phantom lines 81*a* against lobe 76*c*. This has the effect, as illustrated in FIGURE 5, of moving switch 84 from its illustrated full line position to its alternate position illustrated by phantom lines 84*a*. The motor circuit is therefore open and the star wheel cam 75 stops. The dimension of the lobes on cam 75 and their spacings about motor shaft 71 are so related that by the time the cam has rotated through an angle far enough to move stud 67 to its alternate position 67*a* at the outer end of lobe 76*a* switch actuating arm 81 will also have been moved to its alternate position 81*a* to deenergize the motor and stop the cam wheel. By reason of this positionment of stud 67, slide arm 50 will continue to hold brake band 35 against drum 13 and hold pressure roller 20 away from capstan 18 and the tape will not move. Since motor 70 is not energized, the pause thus instituted in the tape travel may be continued through as long or as short an interval as is necessary or desired. To restart the tape the operator needs only to again press button 82 and as explained above, the effect will be to now shift switch 83 from its alternate position 83*a* back to its solid line position 83. In this new position of the switch 83, the motor circuit will be again completed, this time through line 94 and switch 84 which is now at switch 84*a* position. Motor 70 is therefore again energized and the star cam wheel 75 will start to turn. This time lobe 76*a* will move beyond stud 67 and allow stud 67 to be guided along surface 79 to a position in the bottom of the dwell between an adjacent pair of lobes, but this time comprising 76*a* and 76*d*. Simultaneously, lobe 76*c* against which actuating arm 81 has been resting has moved to a new position where like lobe 76b it has moved switch actuating arm 81 to its originally depressed full line position where it effectively returns switch 84 also to its full line position indicated in FIGURE 5. Accordingly, the motor circuit is again interrupted. Cam 75 has ceased to rotate and since end 78 of lobe 76a is no longer engaging on stud 67, the compressive force of spring 27 is available to react on lever 58 to first return pressure roller 20 to its frictional engagement or holding of the tape against the capstan 18 and also to return actuating slide arm 50 to its FIGURE 1 position. The action of spring 27 in returning slide 50 to its retracted position is also aided by helper spring 86, which is shown as connected at one end 87 to the upturned end 53 of the lever and at its opposite end 88 to end 61 of lever 58. Thus, it will be understood that when slide 50 is initially moved to its FIGURE 2 position under the force of cam lobe 76a acting on stud 67, spring 86 is slightly stretched and when stud 76a is moved beyond 76, this stored tension within spring 86 is available to act on the slide arm to return it to its retracted position and simultaneously move stud 67 along surface 79** of the succeeding cam lobe into its inner position in the dwell between the adjacent lobes of the cam.

Therefore, it will be appreciated that the present invention provides a simple yet highly effective pausing function which involves both a positive braking action on the supply reel and also release of the pressure roller from frictional engagement against capstan 18 so that the advance of the tape 15 can be conveniently and almost instantaneously halted and as quickly and conveniently restarted. Moreover the pause function can be obtained essentially noiselessly and with no particular requirement on the part of the operator other than to depress button 82.

Referring again to FIGURE 5, although the position of motor 70 and switch 84 is fixed, lines 92, 93, 94 may be of any desired length and which will permit switch 83 to be located at any required distance from the machine 10. Accordingly, the invention contemplates that lines 92, 93 and 94 are relatively long and preferably encased in a sheath 85 and switch 83 and its button 82 also enclosed within an appropriate housing 84 affixed to the end of said sheath 85. Accordingly, the operator will be free to roam within the limits of the length of said sheathed lines and without having to lose control over the pausing function.

Thus it will be appreciated that all the recited objects, advantages and features of the invention have been demonstrated as obtainable in a highly practical mechanism and one that is not only simple and positive in its operation but also inexpensive to manufacture. It will be further understood that although the invention has thus been described wih a specific embodiment thereof, various modifications of the invention may be had and are intended to be encompassed within the spirit and scope thereof as indicated by the claims.

Thus having described my invention, I claim:

1. In a tape scanning machine adapted for moving tape past a transducer head for reproducing or recording sound thereon, the combination of a first means mounted for reciprocatable movement between a position where said first means is effective to halt the tape travel and a second position where it is not thus effective, energizable drive means for moving said first means between said two positions, control means remotely positionable relative to said machine and successively operable to activate the drive means to move the first means from one of said positions to the other of its positions, and means actuated by the activation of the drive means to limit the movement of the first means to from one of its positions to the other position such that each time the control means is operated the first means will be driven by the drive means in the opposite direction and so that successive operations of the control means will serve to halt and then to restore tape travel.

2. The combination claimed in claim 1, wherein the first means includes a slide acting on tape braking mechanism provided the machine, and the drive means comprises a rotatable cam having a non-circular peripheral surface in continuous engagement with said slide.

3. The combination claimed in claim 1, wherein the machine includes a fixed but continuously rotating capstan and movable pressure roller for frictionally engaging the tape therebetween to translate rotational movement of the capstan and into longitudinal movement of the tape, the first means acting on a slide supporting the pressure roller such that in one position of the first means the pressure roller is out of engagement with the tape and capstan and in its second position the pressure roller effects said frictional engagement, and the drive means comprises a rotatable cam having a non-circular peripheral surface engaging the first means to effect said movements thereof.

4. In a tape scanning machine adapted for moving tape past a transducer head for recording or reproducing sound therefrom the combination of operating means movable into one position where it is effective to halt the tape travel and out of said position to restore tape travel, a rotatable drive cam having a cam surface including at least one high portion and one low portion, said cam surface being in engagement with said operating means such that when the low portion of its cam surface engages the operating means said means is held out of said position and the tape movement is not inhibited thereby and such that when the high portion of its cam surface engages the operating means it is held in said position so as to halt the tape travel, a motor for effecting rotation of said cam, a first actuatable member operable to cause the motor to turn the cam through an angle sufficient to shift engagement of the operating means between the high and low position of the cam, and additional means actuated by rotation of the cam to limit rotation thereof to said angle whereby in successive operations of the first actuatable member the tape travel can be halted and then restarted.

5. In a tape scanning machine adapted for moving tape past a transducer head for recording or reproducing sound thereby, the combination of an operating member mounted for reciprocating movement into one position where it is effective to halt the tape travel and out of said position to restore tape travel, a rotatable drive cam having an undulated surface in engagement with said operating member such that when a low portion of its surface engages said member it is held out of said position and the tape travel is not inhibited thereby and when a high portion of said cam surface engages said member it is held in said position to halt the tape travel, a motor for rotating said cam, and an operating circuit for said motor including first and second switches, the first switch being manually operable to close said circuit and energize the motor to rotate the cam through an angle sufficient to shift engagement of the cam with the operating member between adjacent high and low portions of its undulated surface, the second switch being operated by rotation of the cam to open the motor circuit to stop further rotation of the cam each time it is turned through said angle which is sufficient to shift said engagement of the operating means between adjacent high and low portions of the cam surface whereby the first switch may be successively operated to halt and then restore tape travel.

6. The combination claimed in claim 5 wherein the cam comprises a series of uniformly spaced lobes, and the operating member includes a reciprocatably mounted slide member having a depending stud in continuous engagement with the periphery of said cam such that when located within the dwell between two adjacent lobes thereof the slide member is in retracted position so as not to retard tape travel and when engaged against the outer end of a lobe is in an operating position for halting the tape travel.

7. The combination claimed in claim 6 wherein the second switch is operated by means engaging said lobes so as to limit rotation of the cam to a distance sufficient to move the stud from the dwell between two adjacent lobes to the end of the next lobe, and on the succeeding actuation of the first switch into the next dwell between adjacent lobes of the cam.

References Cited

UNITED STATES PATENTS 2,962,269 11/1960 Loewe et al. ------ 242—55.12
3,263,559 8/1966 Golden -------------- 88—28

LEONARD D. CHRISTIAN, *Primary Examiner.*